United States Patent [19]

Sakoe

[11] Patent Number: 4,479,236
[45] Date of Patent: Oct. 23, 1984

[54] PATTERN MATCHING DEVICE OPERABLE WITH SIGNALS OF A COMPRESSED DYNAMIC RANGE

[75] Inventor: Hiroaki Sakoe, Tokyo, Japan
[73] Assignee: Nippon Electric Co., Ltd., Tokyo, Japan
[21] Appl. No.: 345,447
[22] Filed: Feb. 3, 1982
[30] Foreign Application Priority Data
  Feb. 17, 1981 [JP] Japan .................................. 56-21987
[51] Int. Cl.³ .............................................. G06K 9/00
[52] U.S. Cl. ......................................... 381/43; 382/3; 382/34
[58] Field of Search .................................. 381/41–45; 382/34, 36, 3

[56] References Cited
U.S. PATENT DOCUMENTS
3,816,722 6/1974 Sakoe et al. ........................... 382/34
3,983,535 9/1976 Herbst et al. .......................... 382/34

Primary Examiner—John C. Martin
Assistant Examiner—Erin A. McDowell
Attorney, Agent, or Firm—Sughrue, Mion, Zinn, Macpeak, and Seas

[57] ABSTRACT

A pattern matching device generally comprises a first circuit (36) for calculating an elementary similarity measure between two feature vectors, one and the other selected from two feature vector sequences representative of two patterns, respectively, and a second circuit (37) for iteratively calculating a recurrence formula which defines a recurrence value by a sum of such an elementary similarity measure and an extremum of a prescribed number of previously calculated recurrence values. The recurrence formula eventually gives an overall similarity measure between the two patterns. The elementary similarity measure is now calculated by calculating a primitive similarity measure by a conventional circuit (15) and subtracting a predetermined value therefrom by a compensation circuit (31). Preferably, the second circuit (37) comprises circuitry (41, 42) for preventing the sum from overflowing outwardly of a preselected range.

5 Claims, 10 Drawing Figures

FIG. 4
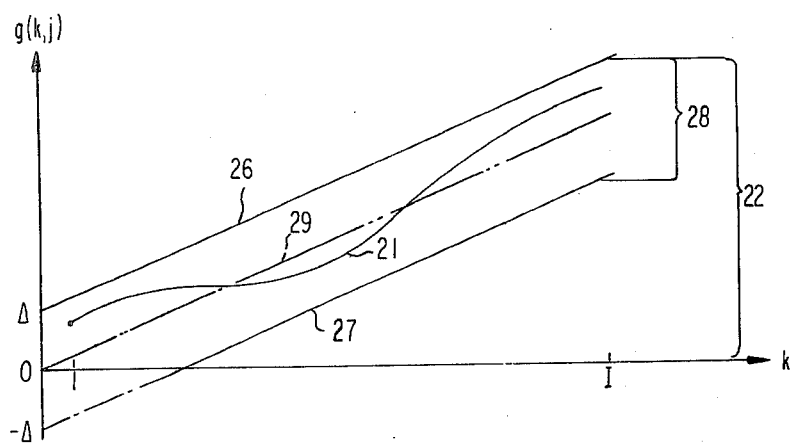
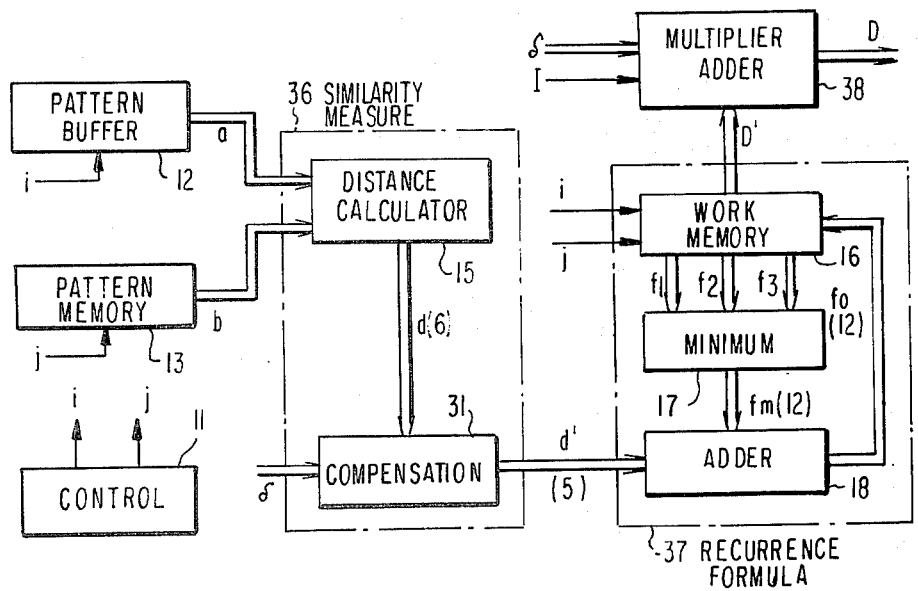
FIG. 5
FIG. 9(B)
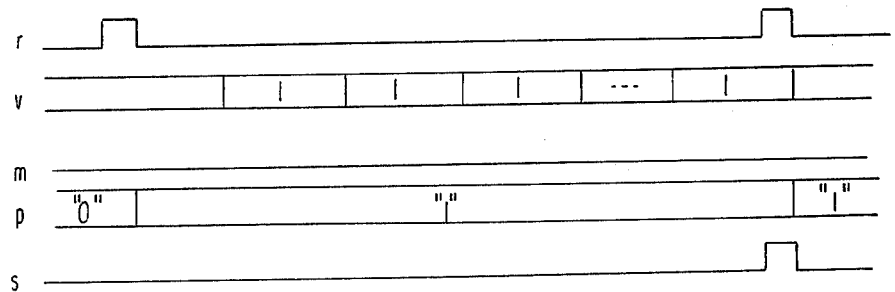

PATTERN MATCHING DEVICE OPERABLE WITH SIGNALS OF A COMPRESSED DYNAMIC RANGE

BACKGROUND OF THE INVENTION

This invention relates to a pattern matching device for carrying out pattern matching between two patterns by calculating a similarity or likelihood measure between the patterns.

Each pattern may be given by a spoken word or a plurality of continuously spoken words. Alternatively, the pattern may be a figure or diagram which, in turn, may be type-printed characters or hand-printed letters. The pattern matching device serves as a main structural unit of a pattern recognition system as disclosed in U.S. Pat. No. 3,816,722 issued to Hiroaki Sakoe, the present applicant, et al, assignors to Nippon Electric Co., Ltd., the instant assignee. Such a device is useful also in a continuous speech recognition system as revealed in U.S. Pat. No. 4,059,725 issued to Hiroaki Sakoe, the instant applicant, and assigned to the present assignee.

The dynamic programming technique or algorithm as called in the art, is resorted to in a majority of pattern matching devices which are now in actual use. According to the dynamic programming technique, the two patterns are represented by a first and a second sequence of feature vectors, respectively. Each sequence consists of a certain number of feature vectors depending on the pattern represented by that sequence. A primitive similarity measure is calculated between each feature vector of the first sequence and each feature vector of the second sequence. A recurrence formula is calculated, which defines a recurrence value by a sum of each primitive similarity measure and an extremum of a prescribed number of previously calculated recurrence values. The extremum is a minimum and a maximum when the primitive similarity measure is given, for example, by a distance measure and a correlation measure between the two feature vectors, respectively. The recurrence formula eventually gives an eventual similarity measure representative of whether the two patterns are similar or dissimilar to each other.

For a pattern recognition system, a plurality of reference patterns are preliminarily registered therein as reference feature vector sequences. An unknown pattern to be recognized, is supplied to the system as an input feature vector sequence. The unknown pattern is subjected to the pattern matching successively with the reference patterns. The unknown pattern is recognized as one of the reference patterns that provides an extremum eventual similarity measure relative to the unknown pattern.

As will later be discussed in detail with reference to a few of about ten figures of the accompanying drawing, a conventional pattern matching device comprises a work memory and a calculating circuit which must deal with signals having a multiplicity of bits particularly when the pattern to be subjected to the pattern matching is represented by a sequence of a considerably great number of feature vectors. In other words, signals processed by the work memory and the calculating circuit or circuits, must have a wide dynamic range. The pattern matching devices have therefore been relatively bulky and expensive. It has furthermore been inconvenient to implement such devices by the known integrated semiconductor circuit technique.

On the other hand, it has been known as described in an article which Fumitada Itakura contributed to IEEE Transactions of Acoustics, Speech, and Signal Processing, Volume ASSP-23, No. 1 (February 1975), pages 67–72, under the title of "Minimum Prediction Residual Principle Applied to Speech Recognition," that the speed of pattern recognition can be increased by rejecting or discontinuing the pattern matching in a pattern recognition system when the reference pattern being subjected to the pattern matching, gives a distance measure greater than a predetermined threshold.

SUMMARY OF THE INVENTION

It is therefore an object of the present invention to provide a pattern matching device operable with signals of a compressed dynamic range.

It is another object of this invention to provide a pattern matching device of the type described, which is operable with signals of a relatively small number of bits.

It is still another object of this invention to provide a pattern matching device of the type described, which is compact and yet inexpensive.

It is yet another object of this invention to provide a pattern matching device of the type described, which is readily implemented by the known integrated semiconductor circuit technique.

It is a further object of this invention to provide a pattern matching device of the type described, which can render a pattern recognition system compact and yet inexpensive.

It is an additional object of this invention to provide a pattern matching device of the type described, in which the pattern rejection technique described in the above-cited Itakura article, is implemented to give a pattern recognition system a higher speed of operation.

It is possible to specify that a pattern matching device to which this invention is applicable, is for calculating an overall similarity measure between a first and a second pattern represented by a first and a second sequence of feature vectors, respectively. The device comprises first means for calculating an elementary similarity measure between each feature vector of the first sequence and each feature vector of the second sequence, and second means for iteratively calculating a recurrence formula which defines a recurrence value by a sum of each elementary similarity measure and an extremum of a prescribed number of previously calculated recurrence values. The recurrence formula eventually gives the overall similarity measure. According to this invention, the first means comprises means for calculating a primitive similarity measure between each feature vector of the first sequence and each feature vector of the second sequence, and means for subtracting a predetermined value from the primitive similarity measure to provide the elementary similarity measure.

In the above-specified pattern matching device, the primitive similarity measure calculating means may successively calculate the primitive similarity measure between each feature vector of the first sequence and a plurality of those sequential feature vectors of the second sequence which are in a range specified by the first sequence feature vector under consideration. Such a device generally comprises means for providing the total number of feature vectors of the first sequence when the overall similarity measure is given. If desired, the device may further comprise third means for adding a product of the predetermined value and the total number to the overall similarity measure to provide an eventual similarity measure of the type described above.

BRIEF DESCRIPTION OF THE DRAWING

FIG. 4 is a diagram for use in describing the principles on which a pattern matching device according to the instant invention is based;

FIG. 5 is a block diagram of a pattern matching device according to a first embodiment of this invention;

FIG. 9 (B), drawn below FIG. 5 merely for convenience of illustration, is another time chart for use in describing operation of the device depicted in FIG. 8.

DESCRIPTION OF THE PREFERRED EMBODIMENTS

Figure 1:
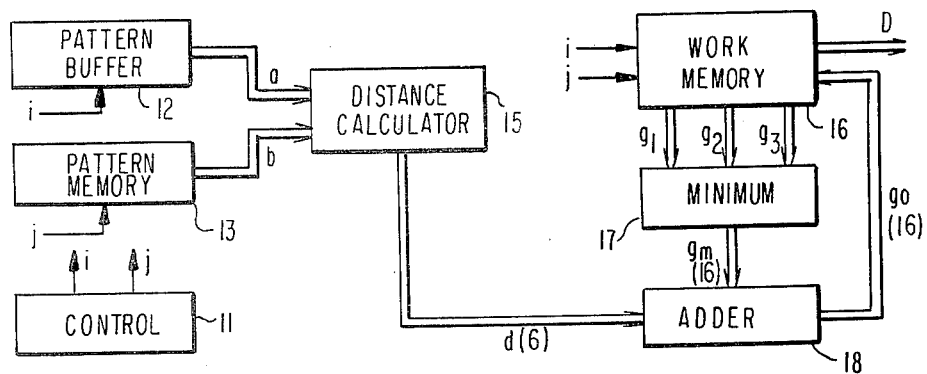
FIG. 1 is a block diagram of a conventional pattern matching device.

Referring to FIG. 1, a pattern matching device illustrated in the above-referenced Sakoe of U.S. Pat. No. 4,059,725 with reference to FIG. 6 thereof, will be described at first as an example of a conventional pattern matching device in order to facilitate an understanding of the present invention. Merely for simplicity of description, it will be assumed in the following that the pattern matching device is for use in a speech recognition system. Also, an eventual or total distance D(A, B) between first and second patterns A and B will be used as an eventual or total similarity measure between the patterns A and B on carrying out pattern matching. Furthermore, a vector â or the like will be denoted by a corresponding letter, such as a. As the case may be, the first and the second patterns A and B will be referred to as an input and a reference pattern, respectively.

As described in the above-cited Sakoe et al U.S. Pat. No. 3,816,722, it is possible to represent the input pattern A by a first time sequence of first through I-th input or first pattern feature vectors $a_1, a_2, \ldots, a_i, \ldots,$ and $a_I$, where $a_i$ indicates an i-th input pattern feature vector representative of a speech sample sampled with a predetermined sampling period, which is typically ten milliseconds long, at an i-th instant i. The reference pattern B is represented by a second time sequence of first through J-th reference or second pattern feature vectors $b_1, b_2, \ldots, b_j, \ldots,$ and $b_J$, where $b_j$ represents a similar speech sample at a j-th instant j. Such a time sequence is produced by a band-pass filter bank as described in the Sakoe et al patent with reference to FIG. 11 thereof. Completion of the pattern matching automatically provides the total number I of feature vectors of the sequence representative of the input pattern A. It is possible to understand that the feature vectors of the first and the second time sequences are arranged along first and second time axes i and j (the same reference letters being used merely for simplicity of denotation).

The pattern matching device comprises a control unit 11 for producing first and second address or timing signals i and j representative, at one time, of one integer of a first set and one integer of a second set, respectively. An i-th integer i of the first set and a j-th integer j of the second set are for use, among others, in designating the i-th input pattern feature vector $a_i$ and the j-th reference pattern feature vector $b_j$, respectively. The control unit 11 furthermore produces various control signals for use in controlling other parts of the device. Such control signals are not depicted in the figure being referenced. A pattern buffer 12 is for holding a predetermined number of the input pattern feature vectors. Responsive to the first address signal i, the pattern buffer 12 produces a first vector signal a representative of the input pattern feature vectors designated by the integers i's. A pattern memory 13 is for memorizing the second time sequence or sequences. Responsive to the second address signal j, the pattern memory 13 produces a second vector signal b representative of the reference pattern feature vectors designated by the integers j's. The pattern buffer 12 and the pattern memory 13 may both be pattern buffers and called a first and a second pattern buffer, respectively.

Responsive to the first and the second vector signals a and b representative of the i-th input pattern feature vector $a_i$ and the j-th reference pattern feature vector $b_j$, a distance calculator 15 calculates an elementary distance d(i, j) between the vectors $a_i$ and $b_j$ to provide a distance measure signal d representative of the calculated elementary distance. The elementary distance d(i, j) is for use as the primitive similarity measure described heretobefore. As will later be exemplified in detail, the distance calculator 15 successively calculates such elementary distances d(i, j)'s for use in calculating the eventual distance D(A, B).

On calculating such an eventual similarity measure D(A, B), it is very desirable to map or warp the first and the second time axes i and j relative to each other as discussed in an article contributed by Hiroaki Sakoe, the present applicant, et al to IEEE Transactions on Acoustics, Speech, and Signal Processing, Volume ASSP-26, No. 1 (February 1978), pages 43–49, under the title of "Dynamic Programming Algorithm Opitimization for Spoken Word Recognition." By way of example, the eventual distance is calculated in compliance with:

$$D(A, B) = \min_{j=j(i)} \left[ \sum_{i=1}^{I} d(i, j) \right], \tag{1}$$

where $j = j(i)$ represents a mapping or warping function for mapping the second time axis j to the first time axis i. It is known in the art that j(1) is equal to 1 and j(I), to J. According to Equation (1), the elementary distances are summed up from a starting point (1, 1) up to an end point (I, J) with the integer i of the first set consecutively varied and with the integer j of the second set varied as given by a mapping function. The summations are calculated for various mapping functions. The Equation (1) represents the fact that the eventual distance is given by a minimum of the summations. The minimum occurs when the elementary distances are summed up along an optimum mapping function $j = \hat{J}(i)$.

Figure 2:
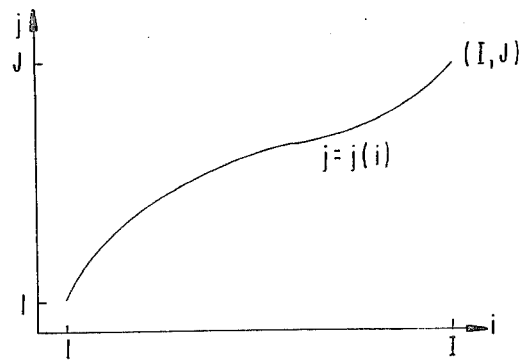
FIG. 2 exemplifies a mapping function, known in the art, for a pattern matching device in general.

Turning to FIG. 2 for a short while, it is possible to depict a mapping function $j = j(i)$ by a curve on an i-j plane between the starting and the end points (1, 1) and (I, J). Incidentally, the mapping function generally monotonously increases with an increase in the integer i of the first set. Although drawn as a smooth curve, the mapping function is given in fact by a plurality of discrete points or a polygonal line passing through the discrete points because the independent and the dependent variables i and j(i) are representative of only integers.

In compliance with the dynamic programming technique, the right-hand side of Equation (1) is minimized by iteratively calculating a recurrence formula which defines a recurrence value by a sum of each primitive similarity measure and an extremum of a prescribed number of previous recurrence values. When an asymmetric three-freedom form as called in the art is used for the elementary distance, the recurrence formula is given by:

$$g(i, j) = d(i, j) + \min \begin{bmatrix} g(i-1, j) \\ g(i-1, j-1) \\ g(i-1, j-2) \end{bmatrix} \quad (2)$$

where $g(i, j)$ will be named an (i, j)-th recurrence value. Starting at an initial condition:

$g(1, 1) = d(1, 1)$, the recurrence formula (2) is calculated with the first address signal made to designate consecutively increasing integers i's of the first set and with the second address signal made to indicate a plurality of consecutive integers j's of the second set during an interval of time in which the first address signal represents each integer of the first set. It is sufficient that the integers j's of the second set be varied from a smaller integer to a greater integer for each integer i of the first set in compliance with an adjustment window condition:

$i - r \leq j \leq i + r$, where r represents a preselected positive integer known as a window length in the art. In this event, it is preferred that the distance calculator 15 (FIG. 1) successively calculates the elementary distances d(i, j)'s between each input pattern feature vector and a plurality of reference pattern feature vectors which are in a range conditioned by the adjustment window for the input pattern feature vector under consideration. When the recurrence formula (2) is eventually calculated up to i=I and j=J, the eventual distance is given as:

$D(A, B) = g(I, J)$.

Figure 3:
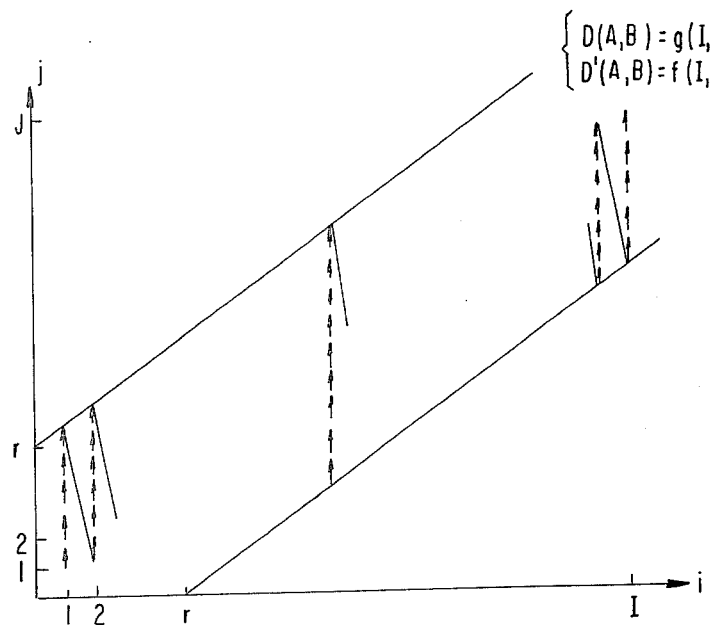
FIG. 3 shows an adjustment window, also known in the art, for a general pattern matching device.

Referring temporarily to FIG. 3, the integers j's of the second set are varied in the adjusment window for each integer i of the first set as described hereinabove. When substantially real time recognition of an input speech pattern is necessary, the above-mentioned interval of time should be equal to the sampling period at which the input speech pattern is sampled so that the input pattern feature vectors are successively supplied to the pattern buffer 12 (FIG. 1).

Referring back to FIG. 1, a work memory or operational register 16 has a plurality of addresses, such as addresses (1, 1) to (r, 1), (1, r) to (r, 2r), (I−2r, J−r) to (I, J−r), and (I−r, J) to (I, J) as depicted in FIG. 3. The addresses are accessible by pairs of integers indicated by the first and the second address signals i and j. At first, the initial condition is set in the work memory 16 at the address (1, 1) as will presently become clear. When the address signals are representative of a pair of integers, one between 1 and I and the other between 1 and J, the work memory 16 is loaded with those previous recurrence values as contents of pertinently smaller-numbered addresses which are previously calculated according to the recurrence formula (2). Responsive to the address signals indicative of the i-th and the j-th integers i and j, the work memory 16 produces three signals $g_1$, $g_2$, and $g_3$ from the addresses (i−1, j), (i−1, j−1), and (i−1, j−2). The three signals are representative of three previous recurrence values for use in calculating the (i, j)-th recurrence value g(i, j).

Supplied with the three signals, a mimimum deciding circuit 17 finds a minimum of the three previous recurrence values and produces a minimum representing signal $g_m$ representative of the minimum, namely, the second term in the right-hand side of the recurrence formula (2). Incidentally, it is known in the art that the work memory 16 should produce a sufficiently great value as any one of the three previous recurrence values when the accessed address lies outside of the adjustment window.

Responsive to the distance measure signal d and the minimum representing signal $g_m$, an adder 18 calculates a sum of the elementary distance d(i, j) and the minimum to produce a sum signal $g_o$ representative of the sum, namely, the (i, j)-th recurrence value g(i, j). The sum signal is supplied back to the work memory 16 and stored in the address (i, j) by a write-in signal (not shown) as a new recurrence value. Such recurrence value signals produced previously of the new recurrence value signal, namely, before designation of the integers i and j, and stored in the work memory 16, provide the previous recurrence values. When the address signals are eventually indicative of the end point (I, J), the work memory 16 produces an eventual distance signal D representative of the eventual distance D(A, B).

It is to be noted here that the eventual distance D(A, B) is defined according to Equation (1) as a summation. Each recurrence value g(i, j) is likewise defined by the recurrence formula (2) as a sum. Both values are greater when the total number I of feature vectors of the first sequence is greater. In other words, the signals representative of these values have a wide dynamic range. More specifically, each of the signals is given by a multiplicity of bits. The work memory 16 must be capable of storing an accordingly great number of bits. The minimum deciding circuit 17 and the adder 18 must deal with that great number of bits.

By way of example, let the average of the elementary distance d(i, j) be sixty-three. When the total number I of the input pattern feature vectors is two hundred (speech of a relatively short duration of only two seconds if the sampling period is ten milliseconds long as described above), the values to be dealt with, grow to 63×200=12,600. The work memory 16, the minimum deciding circuit 17, and the adder 18 must deal with fourteen-bit signals and, more preferably, signals of sixteen bits. A numeral enclosed with a pair of parentheses and labelled adjacent to a reference letter of a signal, represents the number of bits of the signal.

Referring now to FIG. 4, the principles on which a pattern matching device according to this invention is based, will be described. At first, an instant will be taken into consideration, at which the first address signal represents a particular integer k. It is understood from Equation (1) and the recurrence formula (2) that a summation of the elementary distances d(i, j)'s along the optimum mapping function up to i=k and j=J(k) gives a (k, j)-th recurrence value g(k, j). A line depicted as a smooth curve 21 exemplifies such recurrence values g(k, j)'s versus the particular integer k.

For a conventional pattern matching device, the wide dynamic range indicated at 22 has been necessary because the signals representative of such recurrence values g(k, j)'s and the previous recurrence values have been dealt with as they are. Attention is now directed to the fact that the recurrence value g(i, j) (k being rewritten into i) shows a relatively monotonous increase with an increase in the particular integer k and falls in an area between first and second straight lines 26 and 27. A narrow or compressed dynamic range 28 is therefore sufficient.

In order to restrict the signals to the narrow dynamic range 28, the values represented by the signals are changed or compensated for. For example, the straight lines 26 and 27 are made to represent first and second or positive and negative preselected values $+\Delta$ and $-\Delta$, respectively. A bisector 29 of the narrow range 28 now represents zero. The (i, j)-th recurrence value g(i, j) is thereby changed to an (i, j)-th modified recurrence value f(i, j).

The modified recurrence value f(i, j) is related to the original recurrence value g(i, j) by:

$$g(i, j) = f(i, j) + \delta i. \quad (3)$$

where $\delta$ represents the slope of the bisector 29 and will be called a predetermined or compensation value. By substituting Equation (3) into the recurrence formula (2) and by rearranging the resulting formula, a modified recurrence formula results as follows:

$$f(i, j) = [d(i, j) - \delta] + \min \begin{bmatrix} f(i-1, j) \\ f(i-1, j-1) \\ f(i-1, j-2) \end{bmatrix}, \quad (4)$$

where the first term enclosed with a pair of brackets in the right-hand side, will be referred to as a modified distance and denoted by d'(i, j).

Summarizing, the signals representative of such modified recurrence values f(i, j)'s have the narrow dynamic range 28. It is necessary on calculating the modified recurrence formula (4) to subtract the predetermined value $\delta$ from each elementary distance d(i, j) to provide the modified distance d'(i, j). It is also necessary to use a modified initial condition:

$$f(1, 1) = d(1, 1) - \delta.$$

When the modified recurrence formula (4) is eventually calculated up to the end point (I, J), a modified total distance is given by:

$$D'(A, B) = f(I, J).$$

which distance does not directly represent whether the two patterns A and B are similar or dissimilar to each other. If desired, the original eventual distance D(A, B) is calculated from the modified total distance D'(A, B) by:

$$D(A, B) = D'(A, B) + \delta I.$$

It is nevertheless possible to use the modified total distances D'(A, B)'s calculated between one and the same input pattern A and a plurality of reference patterns B's, respectively, as criteria for judging which of the reference patterns B's is most similar to the input pattern A. The modified total distance is therefore capable of serving as an overall similarity measure between two patterns A and B. It is also possible to refer to the modified recurrence formula (4) merely as a recurrence formula (4) and to the modified distance d'(i, j), the modified recurrence value f(i, j), and modified previous recurrence values used in the second term in the right-hand side of the recurrence formula (4), an an elementary similarity measure, merely as a recurrence value, and as peviously calculated recurrence values, respectively.

Turning to FIG. 5, a pattern matching device according to a first embodiment of this invention comprises similar parts designated by like reference numerals. A compensation circuit 31 is a subtractor for subtracting the predetermined value $\delta$ from the elementary distance d(i, j). Responsive to the distance measure signal d, the compensation circuit 31 produces an elementary similarity measure signal d' representative of the elementary similarity measure, here, d'(i, j). It is now understood that a first combination of the distance calculator 15 and the compensation circuit 31 serves as an elementary similarity measure calculating circuit 36 in cooperation with means, such as the control unit 11, for putting the first combination into operation. Operation of the device will be clear to one skilled in the art.

Figure 6:
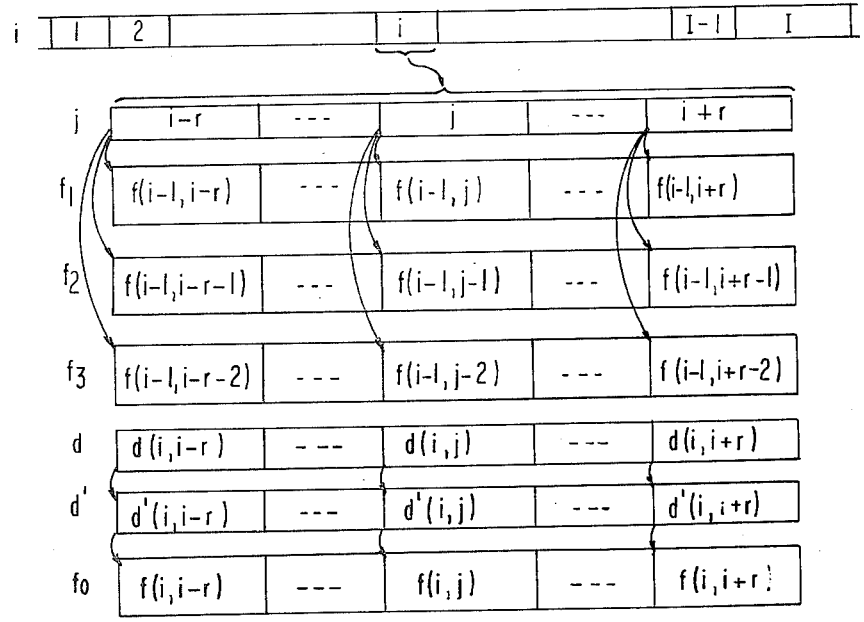
FIG. 6 is a time chart for use in describing operation of the device illustrated in FIG. 5.

Referring to FIG. 6, operation of the device illustrated with reference to FIG. 5 will be described a little more in detail for completeness of description. As depicted along a top line, the first address signal i is varied to consecutively indicate integers 1, 2, ..., i, ..., and I of the first set. During the interval of time in which the first address signal indicates each integer, such as the i-th integer i, the second address signal j is varied so as to designate a plurality of consecutive integers (i−r), ..., j, ..., and (i+r) of the second set as described in conjunction with FIG. 3 and exemplified herein along a second line from the top. The integers j's of the second set are conditioned by the adjustment window. As illustrated in FIG. 5 and herein along three following lines, the work memory 16 produces three signals $f_1$, $f_2$, and $f_3$ representative of successive sets of previously calculated recurrence values f(i−1, i−r), f(i−1, i−r−1), and f(i−1, i−r−2), ..., f(i−1, j), f(i−1, j−1), and f(i−1, j−2), ..., and f(i−1, i+r), f(i−1, i+r−1), and f(i−1, i+r−2). Curved lines drawn between the second line and the three lines with arrowheads, are for indicating the fact that the three signals $f_1$ through $f_3$ are produced with a short delay after the integers j's of the second set are varied.

As described before, the pattern buffer 12 produces the first vector signals a in response to the first address signal and the pattern memory 13, the second vector signal b in response to the second address signal. During the interval in which the first vector signal a represents the i-th input pattern feature vector $a_i$, the second vector signal b successively represents a plurality of consecutive reference pattern feature vectors $b_{i-r}$, ..., $b_j$, ..., and $b_{i+r}$ which are in a range specified by the input pattern feature vector $a_i$ being designated. As depicted along a sixth line as counted from the top, the distance measure signal d successively represents elementary distances d(i, i−r), ..., d(i, j), ..., and d(i, i+r) substantially simultaneously with the variations in the previously calculated recurrence value sets represented by the three signals $f_1$ through $f_3$. As shown along a seventh line, the elementary similarity measure signal d' successively represents elementary similarity measures d'(i, i−r), ..., d'(i, j), ..., and d'(i, i+r) with a short delay again implied by curved lines. As illustrated also in FIG. 5, the adder 18 produces a new recurrence value signal $f_o$ which successively represents new recurrence values f(i, i−r), ..., f(i, j), ..., and f(i, i+r) again with a short delay.

As soon as the first feature vector sequence comes to an end, the control unit 11 keeps the first address signal i indicative of the I-th integer I in the manner known in the art. When the (I, J)-th recurrence value f(I, J) is represented by the new recurrence value signal $f_o$, the work memory 16 eventually produces an overall similarity measure signal D' representative of the overall similarity measure D'(A, B). A second combination of the work memory 16, the minimum deciding circuit 17, and the adder 18 serves as a recurrence formula calculating circuit 37 together with means for putting the second combination into operation. It is now understood that the circuit 37 iteratively calculates the recurrence formula (4) to eventually provide the overall similarity measure, such as D'(A, B).

The eventual similarity measure, such as the eventual distance D(A, B), may be calculated by a multiplier-adder 38 responsive to the first address signal i for calculating a product of the predetermined value δ and the I-th integer I and further responsive to the overall similarity measure signal D' for adding the product δI to the overall similarity measure D'(A, B). Incidentally, it is possible to know the instant at which the recurrence formula calculating circuit 37 has eventually provided the overall similarity measure, in the manner described in U.S. Pat. No. 4,049,913 issued to Hiroaki Sakoe and assigned to the present assignee, with reference to FIG. 1 thereof. Alternatively, either the work memory 16 or the multiplier-adder 38 may comprise a circuit for monitoring the increase in the overall or the eventual similarity measure.

Referring back to FIG. 4, the original recurrence value g(k, j) for the eventual distance D(A, B) is relatively small and great when the first and the second patterns A and B are similar and dissimilar to each other, respectively. The curve 21 representative of the original recurrence value may therefore step outwardly of the first or the second straight line 26 or 27 depending on the similarity or dissimilarity. The modified recurrence value f(i, j) may be subjected to positive overflow to grow greater than the first preselected value +Δ if the dissimilarity is wider than anticipated. The modified recurrence value may undergo negative overflow to decrease less than the second preselected value −Δ when the two patterns A and B are in a relatively closer similarity than is preliminarily assumed by the slope δ of the bisector 29. The overflow, namely, an excursion of the curve 21 above the first straight line 26 or below the second straight line 27, will be avoided if a relatively great value is selected as the preselected absolute value |Δ|. A greater absolute value |Δ| would, however, reduce the technical merits of compressing the dynamic range.

Figure 7:
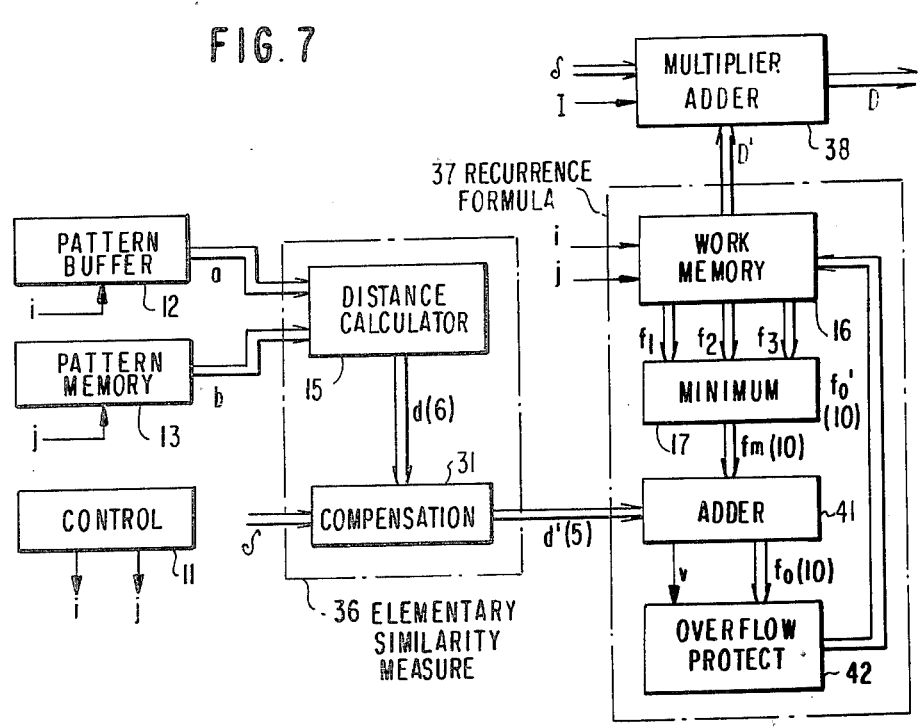
FIG. 7 is a block diagram of a pattern matching device accoding to a second embodiment of this invention.

Turning now to FIG. 7, a pattern matching device according to a second embodiment of this invention comprises similar parts again designated by like reference numerals. A modified adder 41 is substituted for the conventional adder 18. In addition to the new recurrence value signal $f_o$, the adder 41 produces an overflow signal v which takes first, second, and third signal values when the recurrence value f(i, j) is greater than the first preselected value +Δ, is less than the second preselected value −Δ, and is neither greater than the first preselected value +Δ nor less than the second preselected value −Δ, respectively. By way of example, the first through the third signal values may be 1, 2, and 0, respectively. In other words, occurrences of no overflow, the positive overflow, and the negative overflow are indicated by v=0, 1, and 2, respectively. The recurrence formula calculating circuit 37 further comprises an overflow protection circuit 42 between the adder 41 and the work memory 16 to carry out saturation processing. Supplied with the new recurrence value signal $f_o$ and the overflow signal v, the overflow protection circuit 42 supplies a saturation processed signal $f_o'$ to the work memory 16. The saturation processed signal $f_o'$ represents the first preselected value +Δ, the second preselected value −Δ, and the sum f(i, j) when the overflow signal v takes the first through the third signal values, respectively. Inasmuch as the values successively represented by the saturation processed signal $f_o'$ previously of the currently produced saturation processed signal $f_o'$, are stored in the work memory 16 as previously calculated recurrence values, it is possible to call the saturation processed signal $f_o'$ also a new recurrence value signal.

With the device illustrated with reference to FIG. 7, the result of calculation may differ depending on the circumstances from the result achieved with a sufficiently wide dynamic range. It is nevertheless possible by the saturation processing to reduce that adverse effect to a minimum which would otherwise result from continuance of the positive or first overflow. The dynamic range is thereby rendered narrower. Incidentally, operation of the device is little affected by storage of the second or negative preselected value −Δ in the work memory 16 as a new recurrence value.

Figure 8:
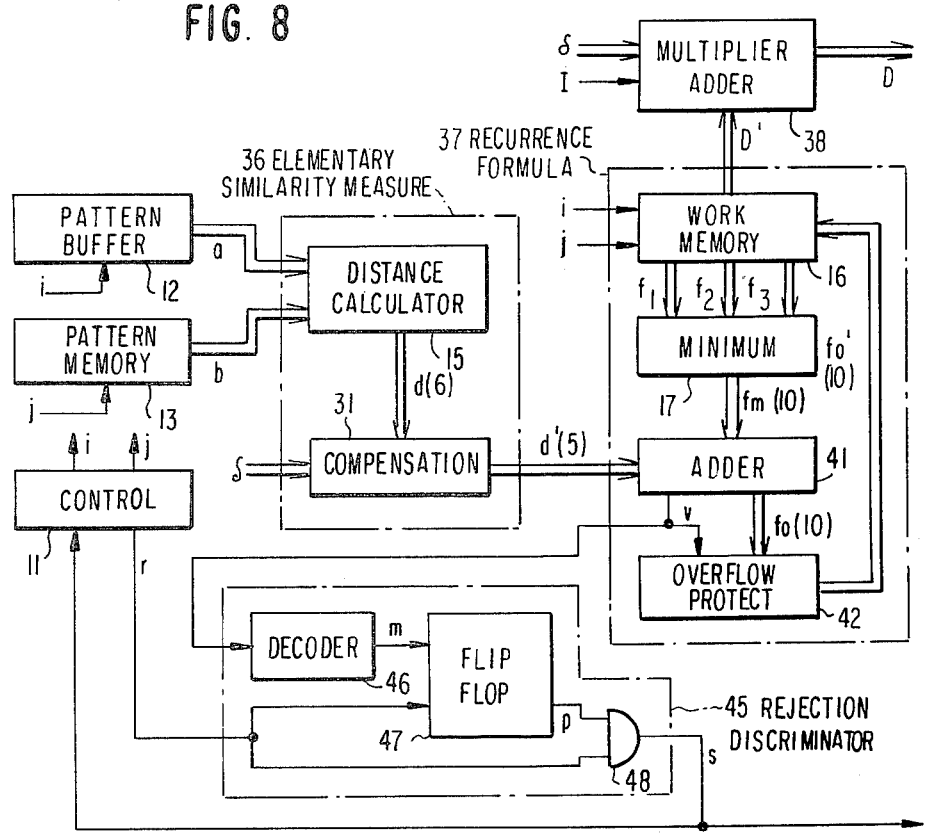
FIG. 8 is a block diagram of a pattern matching device according to a third embodiment of this invention.

Referring to FIG. 8, a pattern matching device according to a third embodiment of this invention comprises similar parts designated by like reference numerals once again. The recurrence formula calculating circuit 37 of the illustrated device comprises a rejection discriminator 45 for use in discontinuing the pattern matching operation if the positive overflow continues throughout the interval in which the first address signal indicates a certain integer, such as the i-th integer i. More specifically, the rejection discriminator 45 keeps the pattern matching operation in progress and discontinues the operation when the overflow signal v always takes and does not always take the first signal value (v=1) throughout the interval, respectively.

Figure 9A:
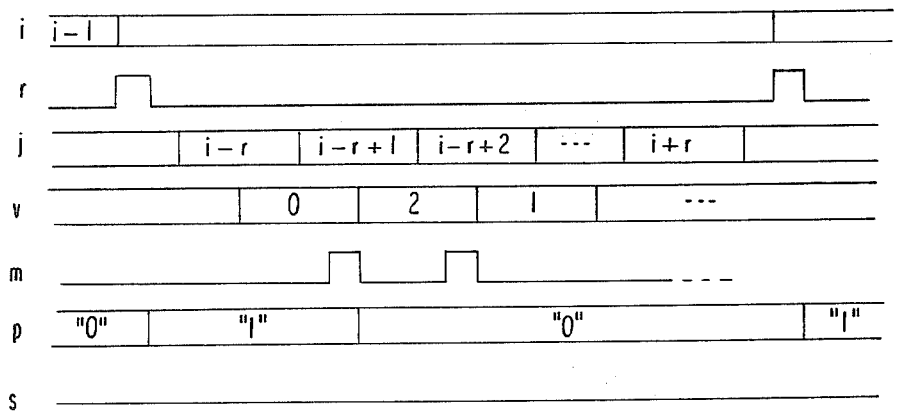
FIG. 9 (A) is a time chart for use in describing operation of the device shown in FIG. 8.

Referring to FIG. 9(A) in addition to FIG. 8, the control unit 11 produces a sequence of timed pulses r building up from a logic zero level to a logic one level and down from the logic one level back to the logic zero level at leading end portions of the respective intervals of time. During the interval in which the first address signal i designates the i-th integer i, the second address signal j is made to consecutively indicate, as described before, the integers (i−r), ..., and (i+r) through the j-th integer j, which is not illustrated herein.

A case is shown in which the overflow signal v does not always take the first signal value. Within the interval for the i-th integer i, the overflow signal v will become representative of either the second or the third value (v=2 or 0) to represent occurrence of no overflow or the negative overflow. The rejection discriminator 45 comprises a decoder 46 for decoding the overflow signal v supplied from the adder 41 to produce a pulse signal m only when v=0 or 2. A flip-flop 47 is set by the timed pulse r supplied to the set input terminal thereof to produce a set output signal p switched from the logic zero level to the logic one level at the trailing edge of the timed pulse r. The pulse signal m, when produced, is supplied to the reset input terminal of the flip-flop 47 to switch the set output signal p from the logic one level back to the logic zero level at the trailing edge of the pulse signal m. The set output signal p of the logic one level is for enabling an AND gate 48 to allow passage of the timed pulse r therethrough as a signal pulse of a rejection signal s. Inasmuch as the set output signal p is turned back to the logic zero level and kept there before later switched to the logic one level at the beginning of a next following interval in which the first address signal i indicates the (i+1)-th integer (i+1), no signal pulse appears in the rejection signal s. The pattern matching operation is kept in progress.

Finally referring to FIG. 9(B), another case is shown in which the positive overflow continues throughout the interval for the i-th integer i. In other words, the overflow signal v always takes the first signal value (v=1) throughout that interval. It is assumed that the positive overflow, if any, did not continue throughout the intervals for the first through the (i−1)-th integers 1 to (i−1). Throughout the interval for the i-th integer i, no pulse signal m is produced. The set output signal p is kept at the logic one level. The timed pulse r produced at the beginning of the interval for the (i+1)-th integer (i+1), passes through the AND gate 48 (FIG. 8) as a signal pulse of the rejection signal s. As depicted in FIG. 8, the rejection signal s is delivered back to the control unit 11 to suspend operation thereof and thereby the pattern matching operation for the pattern B under consideration. The control unit 11 may designate another reference pattern as described in the later-referenced Sakoe patent. The rejection signal s may be fed also to a pertinent unit (not shown) of the pattern recognition system which comprises the pattern matching device.

As thus far been described, a pattern matching device according to this invention is operable with signals of a narrow dynamic range 28 (FIG. 4). It has been confirmed through simulation tests carried out by the use of a general-purpose electronic digital computer that twelve and ten bits are necessary at most as labelled in FIG. 5 and FIGS. 7 and 8, respectively, for the devices shown there.

While this invention has so far been described in conjunction with a few preferred embodiments thereof, it will now be readily possible for one skilled in the art to carry this invention into effect in various other ways. In particular, the first and the second preselected values for use in compressing the dynamic range, may be $2\Delta$ and 0, respectively. In this event, the relationship between the recurrence value g(i, j) for the wide dynamic range 22 (FIG. 4) and the recurrence value f(i, j) for the narrow dynamic range 28, the initial condition, and the relationship between the eventual and the overall similarity measures are:

$$g(i, j) = f(i, j) + \delta i - \Delta,$$

$$f(I, I) = d(I, I) - \delta + \Delta,$$

and $$D(A, B) = D'(A, B) + \delta I - \Delta,$$

respectively. When the correlation measure is used as the similarity measure, the maximum should be used as the extremum. In this event, the pattern matching operation should be discontinued if the negative overflow continues throughout one of the intervals of time.

Modifications are possible also for the hardware implementation. For example, the three signals $f_1$, $f_2$, and $f_3$ may serially be produced rather than in parallel. As regards the work memory 16, it is necessary on calculating the recurrence formula (4) to use previously calculated recurrence values for i=i−1 insofar as the first address signal i is concerned. It is therefore possible to discard the older recurrence values and thereby to reduce the memory capacity. The rejection discriminator 45 may be implemented by various other circuit elements. Furthermore, the combination of signal levels is optional provided that the rejection is properly carried out.

The pattern matching device according to this invention is applicable also to other pattern recognition systems, such as a system described in a paper which Katsuo Ikeda et al contributed to Proceedings of the Fourth International Joint Conference on Pattern Recognition (Nov. 7–10, 1978), pages 813–815, under the title of "On-Line Recognition of Hand-Written Characters Utilizing Positional and Stroke Vector Sequences." Instead of the asymmetric three-freedom form for the recurrence formula (4) or the like, it is similarly possible to use other forms described in the above-referenced Sakoe et al article and others, such as a symmetrical three-freedom scheme. The number of previously calculated recurrence values used in such a recurrence formula, depends on the selected form or scheme. It is also possible to modify Equation (1) by the use of mapping functions of other forms, such as F(i, j)=0, where F represents a function.

Finally, it is possible to make the relevant units of a pattern matching device according to this invention respond to the predetermined or compensation value $\delta$ and the first and the second preselected values, in any optional manners. For example, these values may preliminarily be written in an ROM. Alternatively, a microcomputer may be used to provide these values. If the negative overflow continues throughout several intervals when the minimum is used as the extremum, it is possible to make a discriminator like the rejection discriminator 45 (FIG. 8) detect the fact and switch the predetermined value being used, to a smaller predetermined value. This applies to the other case in which the maximum is used as the extremum, if the positive overflow continues throughout several intervals. In the latter case, the currently used predetermined value should be changed to a greater predetermined value. As will readily be understood from the above, the first and the second predetermined values, such as $2\Delta$ and 0 or $+\Delta$ and $-\Delta$, should be supplied to each of the adder 41 and the overflow protection circuit 42.

What is claimed is:

1. In a pattern matching device for calculating an overall similarity measure between a first and a second pattern represented by a first and a second sequence of feature vectors, respectively, said device comprising first means for calculating an elementary similarity measure between each feature vector of said first sequence and each feature vector of said second sequence, and second means for iteratively calculating a recurrence formula which defines a recurrence value by a sum of each elementary similarity means and an extremum of a prescribed number of previously calculated recurrence values, said recurrence formula eventually giving said overall similarity measure, the improvement wherein said first means comprises:

means for calculating a primitive similarity measure between each feature vector of said first sequence and each feature vector of said second sequence; and means for subtracting a predetermined value from said primitive similarity measure to provide said elementary similarity measure.

2. A pattern matching device for calculating an overall similarity measure between a first and a second pattern represented by a first and a second sequence of feature vectors, respectively, said device comprising first means for calculating an elementary similarity measure between each feature vector of said first sequence and each feature vector of said second sequence, and second means for iteratively calculating a recurrence formula which defines a recurrence value by a sum of each elementary similarity measure and an extremum of a prescribed number of previously calculated recurrence values, said recurrence formula eventually giving said overall similarity measure, the improvement wherein said first means comprises:

means for calculating a primitive similarity measure between each feature vector of said first sequence and each feature vector of said second sequence;

means for subtracting a predetermined value from said primitive similarity measure to provide said elementary similarity measure; and said primitive similarity measure calculating means successively calculating the primitive similarity measures between each feature vector of said first sequence and a plurality of those sequential feature vectors of said second sequence which are in a range specified by the first sequence feature vector under consideration, said device comprising means for providing the total number of feature vectors of said first sequence when said overall similarity measure is given, wherein said device further comprises third means for adding a product of said predetermined value and the total number to said overall similarity measure to provide an eventual similarity measure representative of whether said first and said second patterns are similar or dissimilar to each other.

3. A pattern matching device as claimed in claim 2, wherein said second means comprises:

means for producing an overflow signal which takes first, second, and third signal values when said sum is greater than a first preselected value, is less than a second preselected value, and is neither greater than said first preselected value nor less than said second preselected value, respectively, said first preselected value being greater than said second preselected value; and means for producing a new recurrence value signal which represents said first preselected value, said second preselected value, and said sum when said overflow signal takes said first through said third signal values, respectively, such recurrence value signals produced previously of said new recurrence value signal providing said previously calculated recurrence values.

4. A pattern matching device as claimed in claim 3, said device comprising means for generating a first and a second timing signal, said first timing signal consecutively designating the feature vectors of said first sequence, said second timing signal successively designating those feature vectors of said second sequence which are within a range specified by each feature vector designated by said first timing signal, wherein said device further comprises additional means for keeping operation of said device in progress and discontinuing said operation if said overflow signal always takes and does not always take a predetermined one of said first and said second signal values, respectively, throughout an interval of time in which each feature vector of said first sequence is designated by said first timing signal, said predetermined one signal value being said first and said second signal values when said extremum is a minimum and a maximum, respectively.

5. A pattern matching device as claimed in claim 4, wherein said additional means comprises:

means for generating a sequence of timed pulses at the beginning of the intervals of time in which said first timing signal consecutively designates the respective feature vectors of said first sequence;

means responsive to said overflow signal for producing a pulse signal only when said overflow signal does not always take said predetermined one signal value during each of said intervals;

output switching means responsive to each of said timed pulses for switching an output signal thereof from a first level to a second level, said output switching means being further responsive to said pulse signal for switching said output signal from said second level back to said first level; and signal pulse producing means responsive to the output signal of said first level for producing one of said timed pulses as a signal pulse that discontinues said operation, said signal pulse producing means being further responsive to the output signal of said second level for producing none of said timed pulses to keep said operation in progress.

* * * * *